United States Patent [19]

Bohlen et al.

[11] 3,764,898

[45] Oct. 9, 1973

[54] METHODS OF TESTING THE CONTINUITY OF AN ELECTRICAL CONDUCTOR BY USE OF AN ELECTRON BEAM

[75] Inventors: Harald Bohlen, Sindelfingen; Helmut Engelke; Jurgen Landrock, both of Holzgerlingen, all of Germany

[73] Assignee: International Business Machines Corporation, Armonk, N.Y.

[22] Filed: May 12, 1972

[21] Appl. No.: 252,774

[30] Foreign Application Priority Data
July 28, 1971 Germany............P 21 37 619.2

[52] U.S. Cl.......... 324/51, 250/49.5 PE, 324/158 R
[51] Int. Cl.............................................. G01r 31/02
[58] Field of Search ................. 324/51, 54, 73, 158; 250/49.5 PE

[56] References Cited
UNITED STATES PATENTS

| | | | |
|---|---|---|---|
| 3,531,716 | 9/1970 | Tarui et al. | 324/51 |
| 3,448,377 | 6/1969 | Seiwatz et al. | 324/54 |
| 3,373,353 | 3/1968 | Harris | 324/54 |
| 3,549,999 | 12/1970 | Norton | 324/158 D |
| 3,678,384 | 7/1972 | Oatley | 324/73 R X |
| 3,702,437 | 11/1972 | McGrath | 324/73 R X |

OTHER PUBLICATIONS

Lambert, B., Multipoint Probe, IBM Technical Disclosure Bulletin, Vol. 11, No. 5, Oct. 1968, p. 495

Loeffler, K. H., Automatic Circuit Testing with an Electron Beam, IBM Technical Disclosure Bulletin, Vol. 12, No. 8, Jan. 1970, pp. 1256, 1257

*Primary Examiner*—Gerard R. Strecker
*Attorney*—John F. Osterndorf et al.

[57] ABSTRACT

A non-contact method of testing the electrical continuity of a conductor line. At least one end of the conductor line is bombarded with a beam of electrons. A collector is positioned in spaced proximate relation to this end of the line to control the raising of the potential at this end to a particular level due to secondary emission. Current flows through the line which is measured to indicate the state of continuity in the line.

13 Claims, 4 Drawing Figures

PATENTED OCT 9 1973 3,764,898

METHODS OF TESTING THE CONTINUITY OF AN ELECTRICAL CONDUCTOR BY USE OF AN ELECTRON BEAM

BACKGROUND OF THE INVENTION

1. Field of the Invention

The invention relates to non-contact testing, and more particularly, to a method for testing the electrical continuity of a conductive line by means of electron beams.

2. Description of the Prior Art

With the miniaturization of electronic components, particularly integrated semiconductor devices, the wiring interconnecting these devices has correspondingly decreased in size. Testing of these interconnections has become increasingly complex. With the introduction of multi-layer packaging to the semiconductor technology, optical tests can no longer be performed for checking the continuity of conductor lines. Similarly, due to the miniaturization of the devices and the conductors, conventional electrical testing methods using contactors at the conductor ends have become increasingly more difficult due to the high density of the conductor ends and their proximity to one another.

To avoid these difficulties the use of electron beams in a non-contact method of testing has been suggested. Electron beams are particularly well suited for testing methods on microminiaturized devices because they can be focussed and positioned with high precision. Moreover, they exert an electrical influence on the conductor line which is exposed to the radiation.

The known methods of electron beam testing employ the concept of charging the conductor line to be tested at one end with the electron beam. Owing to the charge compensation in the conductive line, the potential at the opposite end of the conductor is changed. Interrogation of the potential at this opposite end of the conductor line is performed with a second electron beam. For that purpose, a beam of very slow electrons may be used. The beam is slowed down and reflected before impinging on the end of the conductor. The reflected beam provides an indication of the continuity in the line. A highly energized beam may also be employed as the interrogating beam. The secondary electrons generated by this beam are analyzed for their kinetic energy and thus an indication of the potential at this end of the conductor.

These prior art methods have the disadvantage that the distinction between continuity and an interruption or short is detectable only at very high impedance values in the range of $10^9 - 10^{10}$ ohms, due to the low value of capacitance of the conductor lines. Conduction of the minute charges from one end of the conductor line to the other therefore occurs as a result of the high impedance of an interruption or short during the measuring of the potential. Moreover, the use of isolation resistors has the tendency to falsify the test result. In addition, the use of these test procedures must be done during a period amounting to a few microseconds only which is insufficient to determine conclusively the state of the conductor line.

SUMMARY OF THE INVENTION

As contrasted with the prior art methods of non-contact testing, the method of this invention provides for the use of electron beam energy in testing the electrical continuity in a conductor line. However, by employing the method of the invention, the value of impedance at which a distinction may be made between continuity and a short or interruption is at a much lower impedance value than in prior art methods. The inventive method also operates with far greater precision and allows the test to be performed in periods of any duration as the method encompasses the generation of stationary states in making a measurement.

According to one aspect of the invention, the problems of the prior art methods are solved by this method. At least one end of the conductive line is bombarded by an electron beam and brought to a predetermined potential by means of controlled secondary electron emission. Between the two ends of the conductive line, a potential difference occurs causing a determinable and measurable current flow through the conductive line. Preferably, the controlled secondary electron emission from the bombarded conductor end is effected by a collector which is placed near this conductor end and maintained at a predetermined potential. In the alternative, each end of the conductive line can have an associated collector, and a voltage can be applied between the collectors. The current flow through the conductive line is advantageously determined by measuring the resulting current flowing in the supply line for one of the collectors.

DESCRIPTION OF THE PREFERRED EMBODIMENTS

Figure 1:
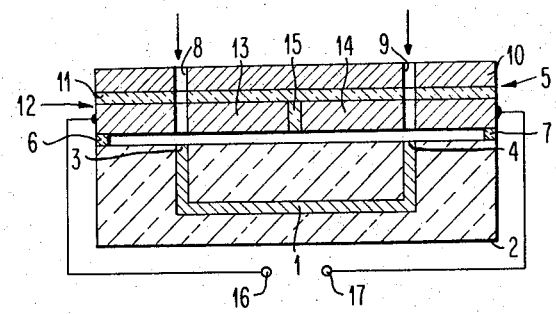
FIG. 1 is a schematic diagram in section of a device and apparatus for carrying out the method of the invention.

Referring now to FIG. 1, a conductor 1 is embedded in a carrier 2 of isolation material. Conductor ends 3 and 4 appear at the upper side of carrier 2 on the surface. The electric continuity of conductor 1 is to be tested. For that purpose, a target mask 5 is arranged in parallel to the upper surface of carrier 2 and at a small distance from the surface as determined by spacers 6 and 7. Target mask 5 has openings 8 and 9 at locations corresponding to the ends 3 and 4 of the conductor. Through openings 8, 9, the conductor ends are bombarded by electron beams (not shown) in the direction of the arrows.

Target mask 5 itself consists of three superimposed layers. An upper metal layer 10 is separated by an isolation layer 11 from a lower metal layer 12. Metal layer 12 in turn is divided into two segments 13 and 14 isolated from each other by element 15. Due to the operation performed by segments 13, 14, they are called collectors. Each collector 13, 14 is provided with an electrical connection so that it can be brought to a predetermined potential via a source of voltage connected at terminals 16, 17, respectively. Collectors 13, 14 function to catch the secondary electrons leaving the respective adjacent conductor end 3, 4. Upper metal layer 10 serves as a screen against primary electrons. In addition, it is brought (in a manner not shown here) to a negative bias of approximately 100V as compared with collectors 13 and 14 to facilitate the collecting of the secondary electrons by the collectors.

For testing conductor 1, a low DC voltage is applied between collectors 13 and 14. Then, two electron beams operating close to the level of maximum secondary emission are directed at conductor ends 3, 4 through openings 8 and 9 of target mask 5.

Figure 2A:
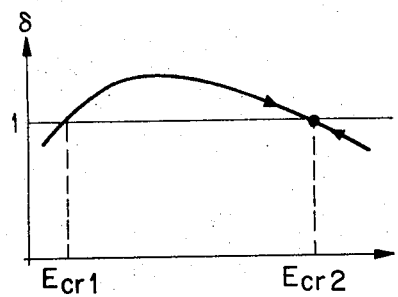
FIGS. 2A and 2B are graphic diagrams of the intensity of the secondary emission, dependent on the energy of the primary electrons and on the potential of the conductor end, respectively.

FIG. 2A shows the course of secondary electron yield $\delta$ as a function of energy $E_{pr}$ of the primary beams. Yield $\delta$ is defined as the ratio of current $I_s$ of the emitted secondary electrons to current $I_{pr}$ of the primary electrons. Primary energy $E_{pr}$ equals the difference between potential $V$ of the radiated conductor end and cathode potential $V_k$, multiplied by the electron charge e:

$$\delta = I_s/I_{pr}; E_{pr} = e (V - V_k).$$

If this conductor end is at a free potential, and if $E_{pr} > E_{cr1}$ (the cross-over energy), the conductor end charges itself to the stable balance value $V_{cr2}$, under the influence of the electron beam. For this stable balance value $V_{cr2}$, the yield $\delta$ is 1. The associated primary energy $E_{cr2}$ is called cross-over energy, similarly to $E_{cr1}$. The value of $E_{cr2}$ depends on the material of the bombarded conductor end and varies round a median value, according to the surface characteristics of the material.

Figure 2B:
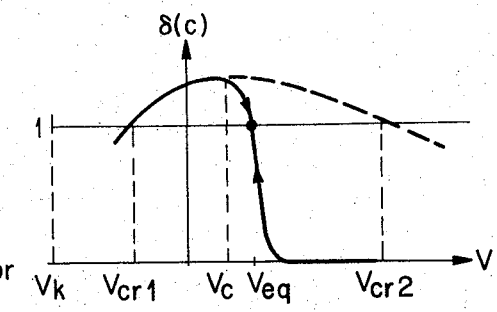

The potential at the conductor end can also be stabilized if a collector is proximately positioned with respect to it. This is accomplished by collector stabilization. A condition for such stabilization is that the testing operation take place in a field of high yield ($\delta > 1$). FIG. 2B shows the dependence of yield $\delta^{(c)}$ on the conductor end potential in the presence of a collector. The collector has the potential $V_c$. Its effect is that in the balance state ($\delta^{(c)} = 1$) the potential of the conductor end adjusts itself to value $V_{eq}$ which lies some volts above the collector potential. This is caused by a sharp drop of the yield curve due to the fact that secondary electrons are slowed down in the field between the conductor end and the collector. They then return to the conductor end and thus do not contribute to current $I_s^{(c)}$. A shifting of collector potential $V_c$ therefore causes an equal shifting of conductor end potential $V_{eq}$.

The use of the collector provides a double advantage. Its presence renders the potential $V_{eq}$ at the conductor end independent of its surface characteristics. In addition, dependent on the steepness of the yield curve in the point of balance, the distinguishing limit between continuity and a short or interruption of the conductor is decreased considerably.

When testing conductor 1, a voltage is applied between collectors 13 and 14. Electron beams attempt to charge the ends of the conductors through openings 8, 9 to different balance potentials slightly above the potentials at the collectors. If the conductor is interrupted or a short exists, the state of balance is independently restored at each conductor end. If the conductor is electrically continuous, however, a common state of balance is achieved which is characterized by a current flowing through the conductor. The potentials of the conductor ends adapt to each other, upon the setting of the balance, until their difference corresponds to the voltage drop in the conductor line. The currents in the supply lines to the collectors are influenced by the conductor current and are therefore monitored for determining the existence of continuity in the conductor.

The height of the current through the conductor line depends on the line's resistance R. As long as this resistance is low as compared with a characteristic value $R_0$, the current is of a value which is independent of the resistor. However, for $R = R_0$ it drops to half the value and disappears when $R$ is high compared with $R_0$.

In the stationary balance of a conductor line during radiation with two electron beams having the same primary energies ($E_{pr1} = E_{pr2}$) and the same beam currents ($I_{pr1} = I_{pr2} = I_{pr}$), the following relation applies for the value $R_0$:

$$R_0 = V (1/I_{pr1} + 1/I_{pr2}) = 2 V/I_{pr}$$

$V$ is the medium energy of the slow secondary electrons and typically may amount to approximately $5V$. For primary currents of 1mA, a characteristic value of 10 $k\Omega$ is obtained for $R_0$. This value can be considered a differentiating or distinguishing limit between continuity and a short or interruption.

For obtaining the test result, the current flowing through the conductor line is measured. However, as this current cannot be measured directly, one of the two collector currents is used for determining the current in the conductor line. The following current balance applies for a conductor end:

$$I_{pr} - I_r + I - I_c = 0$$

$I_{pr}$ being the primary current of the electron beam directed on the conductor end, $I_r$ the current of the electrons emitted by the conductor end, $I$ the current in the conductor, and $I_c$ the current in the supply line to the respective conductor end. If the relation $I_r = \eta \cdot I_{pr}$ is used, $\eta$ representing the emission coefficient, the designation $I_c = (1 - \eta) \cdot I_{pr} + I$ is obtained for the collector current.

The two contributions to collector current $I_c$ may be separated. When testing, a DC voltage is not employed but a low AC voltage of suitable frequency is applied between the two respective collectors. Then, the current $I$ in the conductor can be measured as the AC share of the collector current $I_c$.

When a constant voltage exists between the collectors, the current in the conductor line to be tested may also be determined. To accomplish this, the intensity of the electron beam directed on a conductor end is altered. Consequently, the current flowing through the conductor line is also altered. The alteration of the current flow through the line is measured as an alteration of the current in the supply line to the collector associated with the other conductor end. It is furthermore possible, in determining the conductor current, to apply an alternating voltage between the collectors and to alter the intensity of the electron beam directed on a conductor end. The current flowing to the collector associated with the other conductor end is then measured.

The non-contact test method may also be applied in those cases where the conductor lines are connected only at one side to a connecting pin of the wiring element. In that case, only one electron beam for the free conductor end is required. By means of collector stabilization at this free conductor end, and the application of a low voltage between the collector of the free conductor end and the connecting pin, a current is generated in the conductor line which is measured directly.

Figure 3:
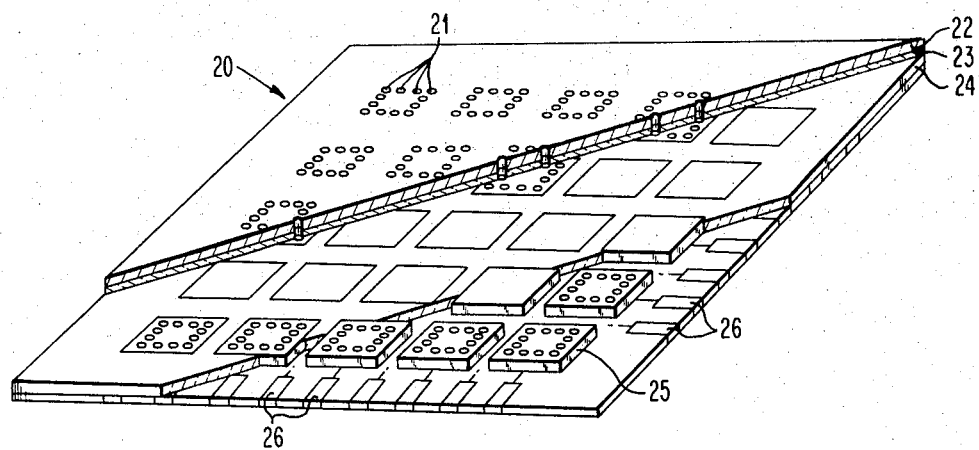
FIG. 3 is a perspective view partially in section of a target mask for the testing of a large number of conductive lines on a carrier for a plurality of semiconductor chips.

In FIG. 3, a partly sectional view of a target mask 20 is shown which is used for testing a wiring component (not shown) to which a total of 25 semiconductor chips is connected. The wiring component is provided at the same time as a carrier for the semiconductor chips. The rectangular semiconductor chips have at their edges connecting points which have associated conductor ends on the surface of the wiring component in the same manner as shown in FIG. 1. Openings 21 in target mask 20 are positioned directly over these conductor ends. As described in connection with FIG. 1, target mask 20 has a continuous conductive upper layer 22, an isolation layer 23 beneath, and a lower layer 24 containing individual collectors 25 which are isolated from each other. Each collector can be applied to a predetermined potential through one of the connections 26.

The connections between the individual components of a single semiconductor chip are made as a part of the semiconductor chip and not as a part of the wiring component. Therefore, each conductor end does not have to be equipped with a collector of its own. For the conductor ends which must be contacted with the points of connection of a semiconductor chip, a common collector can be used. With this apparatus, the method described above is employed to test the conductor lines of the wiring component which joins one semiconductor chip to another semiconductor chip, or to an external connecting pin.

The method that has been described provides for accomplishing the non-contact testing of the electrical continuity of conductor lines and particularly those in multi-layer structures. The differentiation or distinguishing limit between continuity and an interruption or short lies in the range of 10 $k\Omega$. The method employs a target mask and one or two electron beams operating in the field of approximately maximum secondary emission. By means of collector stabilization of the potentials of the conductor ends, a stationary current is generated in the conductor line. This stationary current can be determined as the AC portion in one of the collector currents.

The method has the advantage that the surface of the component containing the conductor line does not suffer any mechanical or chemical alterations as a result of the test. The electrical contacting of the conductor ends through the electron beam is reliable. It depends only on well-controllable parameters and the exact positioning of the electron beam. As the density of the conductor ends increases, this characteristic is of decisive importance. A differentiation or distinguishing limit of approximately 10 $k\Omega$ suffices for the clear identification of interruptions in the conductor lines. The described method operates with more precision than the formerly known electron beam processes for the testing of conductor lines.

While the invention has been particularly shown and described with reference to preferred embodiments thereof, it will be understood by those skilled in the art that various changes in steps and details may be made therein without departing from the spirit and scope of the invention.

What is claimed is:

1. A non-contact method of testing the electrical continuity of a conductor line comprising the steps of:
   bombarding at least one end of the conductor line with a beam of electrons,
   positioning a first collector at a predetermined potential level in a spaced proximate position with respect to said one end of the conductor line,
   raising the potential at said one end by electron beam bombardment, and controlling the secondary emission at a predetermined level by said first collector so that current flows through the conductor line, and
   measuring the current flow at the other end of the conductor line to determine the electrical continuity of the line.

2. The method of claim 1 and further comprising the steps of:
   positioning a second collector in a spaced proximate position with respect to the other end of the conductor line,
   applying a voltage between the two collectors,
   bombarding both ends of the conductor line with electron beams, and
   determining if a state of balance exists at the two conductor ends indicative of electrical continuity in the line.

3. The method of claim 2, wherein the measuring of the current flow through the line is determined by monitoring the current flow to one of the collectors.

4. The method of claim 3, wherein the voltage applied between the collectors is maintained at a constant level and the intensity of one of the electron beams bombarding one end of the line is varied and the current flow to the collector positioned with respect to the other end of the line is monitored.

5. The method of claim 3, wherein the voltage applied between the collectors is an AC voltage and the current flow through the line is ascertained by monitoring the AC current to one of the collectors.

6. The method of claim 5, wherein the intensity of one of the electron beams bombarding one end of the line is varied and the AC current to the collector positioned with respect to the other end of the line is monitored.

7. The method of claim 2 and further comprising the step of:
   controlling the access of the electron beams to the ends of said conductor line by providing a target mask having spaced apart openings aligned with the ends of said lines; said target mask including said collectors electrically isolated from one another;
   and positioning said target mask with said openings superimposed of said conductor line ends.

8. The method of claim 7 wherein the target mask includes a conductive layer electrically isolated from the collectors with the conductive layer acting to screen the electrons from the beams.

9. The method of claim 8, and further comprising the step of:
   applying a bias to the conductive layer to facilitate the collecting of secondary electrons emitted to the collectors from said conductor ends.

10. A non-contact method of testing the electrical continuity of conductor lines interconnecting semiconductor chips and the access lines to the chips in a plural chip integrated circuit package, comprising the steps of:
    positioning a target mask having a plurality of collectors electrically isolated from one another and corresponding to the number of chips in spaced proximate and aligned relationship to the chips, selectively and sequentially bombarding at least one end of each of the conductor lines with a beam of electrons to raise the potential at the bombarded end, and controlling the secondary emission by said collectors to enable current to flow through the selected line, and measuring the current flow at the other end of the selected line to determine the electrical continuity of that line.

11. The method of testing of claim 10, and further comprising the steps of:

applying a voltage between the collectors associated with the selected line, bombarding both ends of the selected line with electron beams, and determining if a state of balance exists at the ends of the selected conductor line indicative of electrical continuity in the line.

12. The method of testing of claim 11, wherein the measuring of the current flow through the selected line is determined by monitoring the current flow to one of the collectors associated with the selected line.

13. The method of claim 12, wherein the applied voltage is constant and the intensity of one of the electron beams is varied.

* * * * *